(12) United States Patent
Brand et al.

(10) Patent No.: US 12,065,163 B2
(45) Date of Patent: Aug. 20, 2024

(54) SYSTEMS AND METHODS FOR AUTONOMOUS FIRST RESPONSE ROUTING

(71) Applicant: Verizon Patent and Licensing Inc., Basking Ridge, NJ (US)

(72) Inventors: Paul Brand, Coppell, TX (US); Kevin Lisewski, Ramsey, NJ (US); Antonio M. Osorio, Jersey City, NJ (US); Mansoor Ali Shah Mohammed, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 306 days.

(21) Appl. No.: 17/444,617

(22) Filed: Aug. 6, 2021

(65) Prior Publication Data

US 2023/0038260 A1    Feb. 9, 2023

(51) Int. Cl.
*B60W 60/00* (2020.01)
*G06F 16/215* (2019.01)
(Continued)

(52) U.S. Cl.
CPC .... *B60W 60/0011* (2020.02); *B60W 60/0025* (2020.02); *G06F 16/215* (2019.01); *G06F 16/29* (2019.01); *G06Q 50/265* (2013.01); *B60W 2420/403* (2013.01); *B60W 2554/40* (2020.02); *B60W 2555/00* (2020.02);
(Continued)

(58) Field of Classification Search
CPC ......... B60W 60/0011; B60W 60/0025; B60W 2420/42; B60W 2554/40; B60W 2555/00; B60W 2555/60; B60W 2556/10; B60W 2556/35; B60W 2556/45; G06F 16/215;
(Continued)

(56) References Cited

U.S. PATENT DOCUMENTS 10,635,099 B2      4/2020  Lisewski et al.
2018/0053401 A1 *  2/2018  Martin ................ H04M 11/04
(Continued)

FOREIGN PATENT DOCUMENTS

EP      3678076 A1 *  7/2020  ........... G06F 16/215
WO  WO-2022015496 A1 *  1/2022  ........... G06N 20/00

OTHER PUBLICATIONS

Choksi et al., Multiobjective Based Resource Allocation and Scheduling for Postdisaster Management Using IoT (Year: 2019).*

*Primary Examiner* — Elaine Gort
*Assistant Examiner* — Chanmin Park

(57) ABSTRACT

A device may receive emergency data, traffic data, network performance data, crime data, and gunshot data associated with a geographical area and may identify a location within the geographical area based on the emergency data, the traffic data, the network performance data, the crime data, and the gunshot data. The device may determine, based on the emergency data, the traffic data, the network performance data, the crime data, and the gunshot data for the location, a risk level for the location and may identify an autonomous vehicle based on the risk level, the traffic data, and the network performance data for the location. The device may determine a route for the autonomous vehicle to the location based on the traffic data and the network performance data for the location, and may perform actions based on the autonomous vehicle and the route.

20 Claims, 10 Drawing Sheets

(51) Int. Cl.
*G06F 16/29* (2019.01)
*G06Q 50/26* (2012.01)
*G01C 21/00* (2006.01)

(52) U.S. Cl.
CPC ..... *B60W 2555/60* (2020.02); *B60W 2556/10* (2020.02); *B60W 2556/35* (2020.02); *B60W 2556/45* (2020.02); *G01C 21/3807* (2020.08)

(58) Field of Classification Search
CPC .. G06F 16/29; G06Q 50/265; G01C 21/3807; G01C 21/3492; G08G 1/00
See application file for complete search history.

(56) References Cited

U.S. PATENT DOCUMENTS

| | | | |
|---|---|---|---|
| 2021/0279603 A1* | 9/2021 | Teran Matus | G06V 20/40 |
| 2023/0025772 A1* | 1/2023 | Crosby | G06N 20/00 |

* cited by examiner

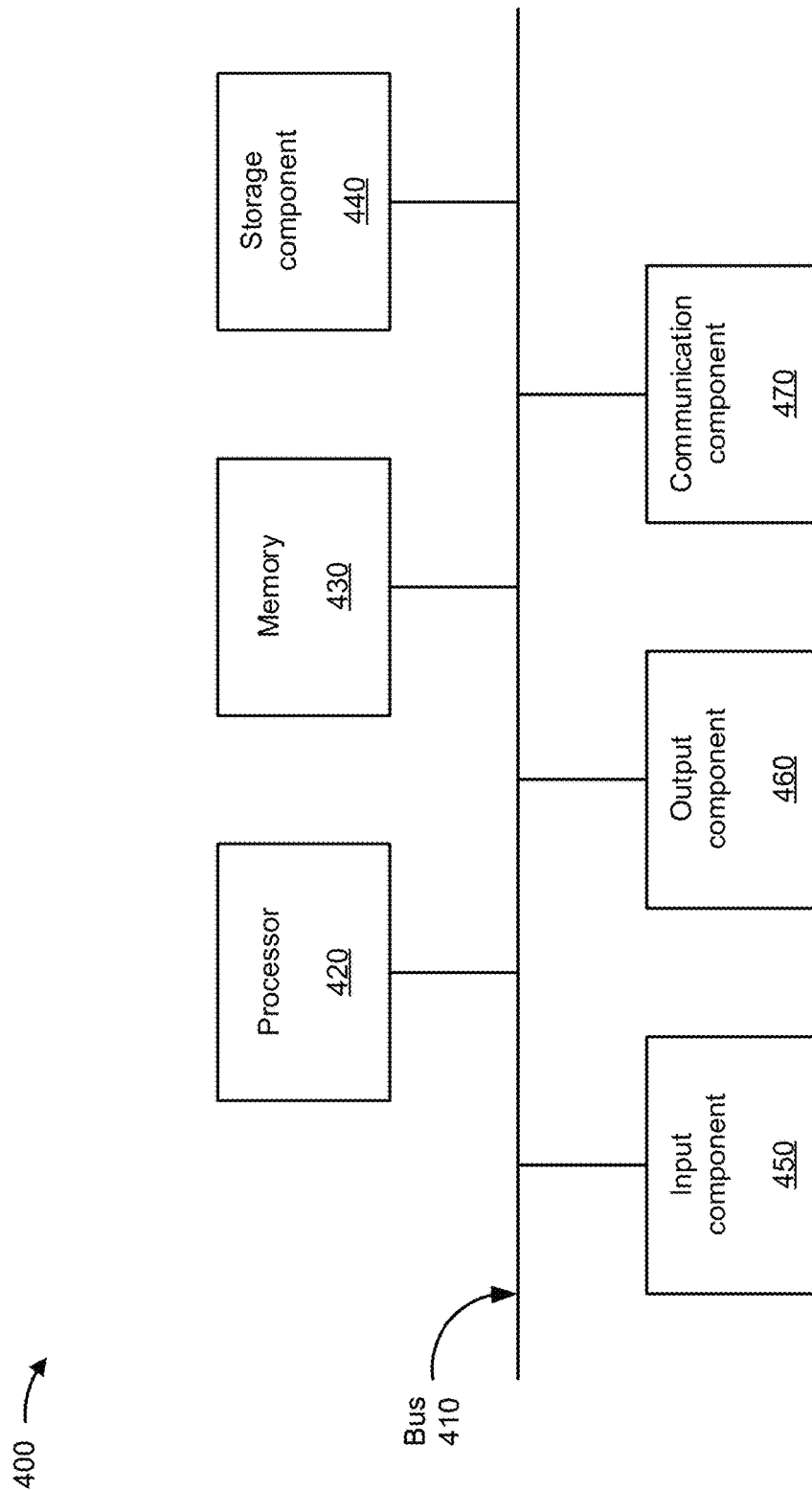

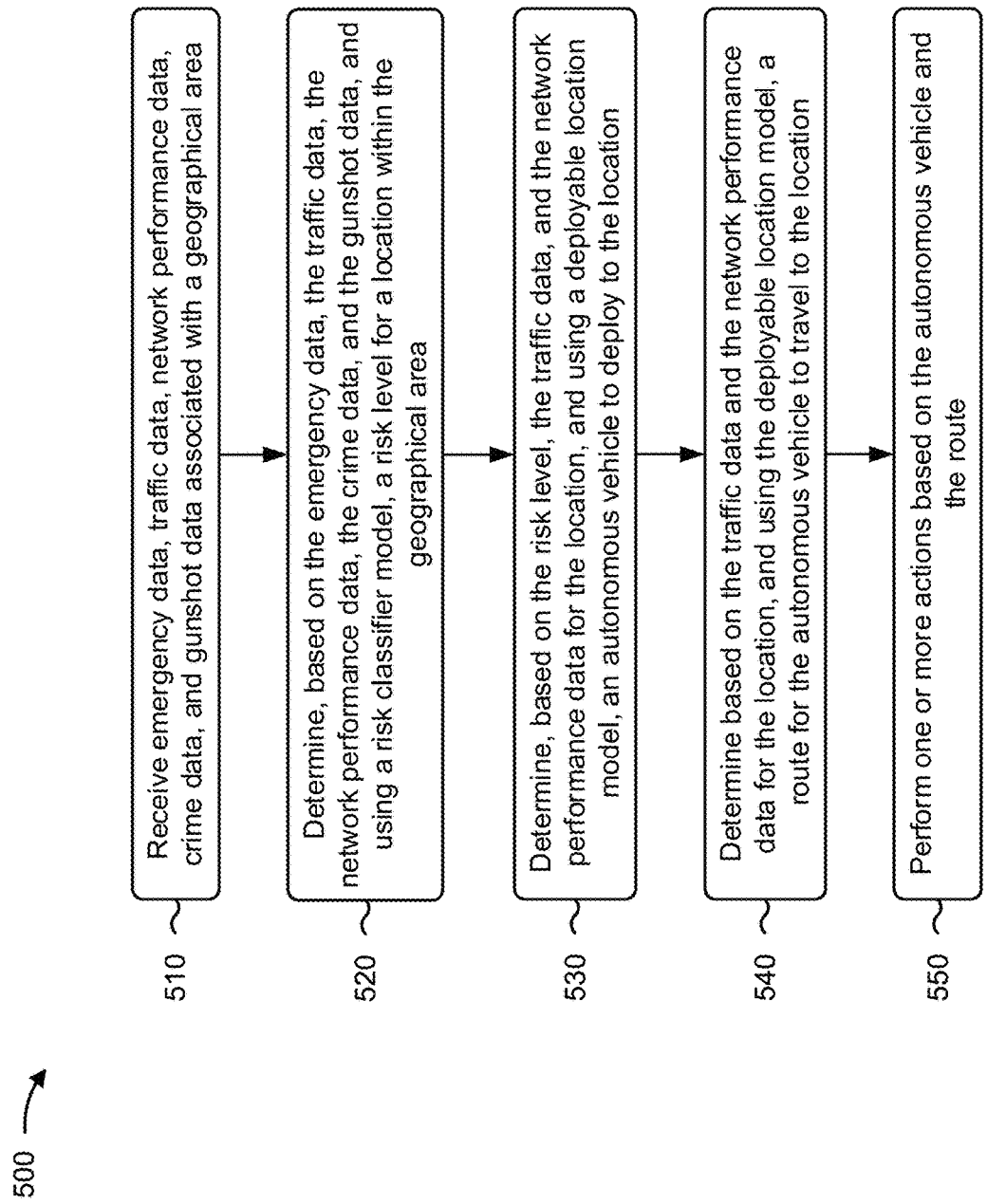

SYSTEMS AND METHODS FOR AUTONOMOUS FIRST RESPONSE ROUTING

BACKGROUND

Ensuring sufficient visible emergency services (e.g., a police presence) is a critical component to a municipal public safety plan.

BRIEF DESCRIPTION OF THE DRAWINGS

FIG. 4 is a diagram of example components of one or more devices of FIG. 3.

FIG. 5 is a flowchart of an example process for autonomous first response routing for improved public safety.

DETAILED DESCRIPTION OF EXAMPLE EMBODIMENTS

Figure 1A:
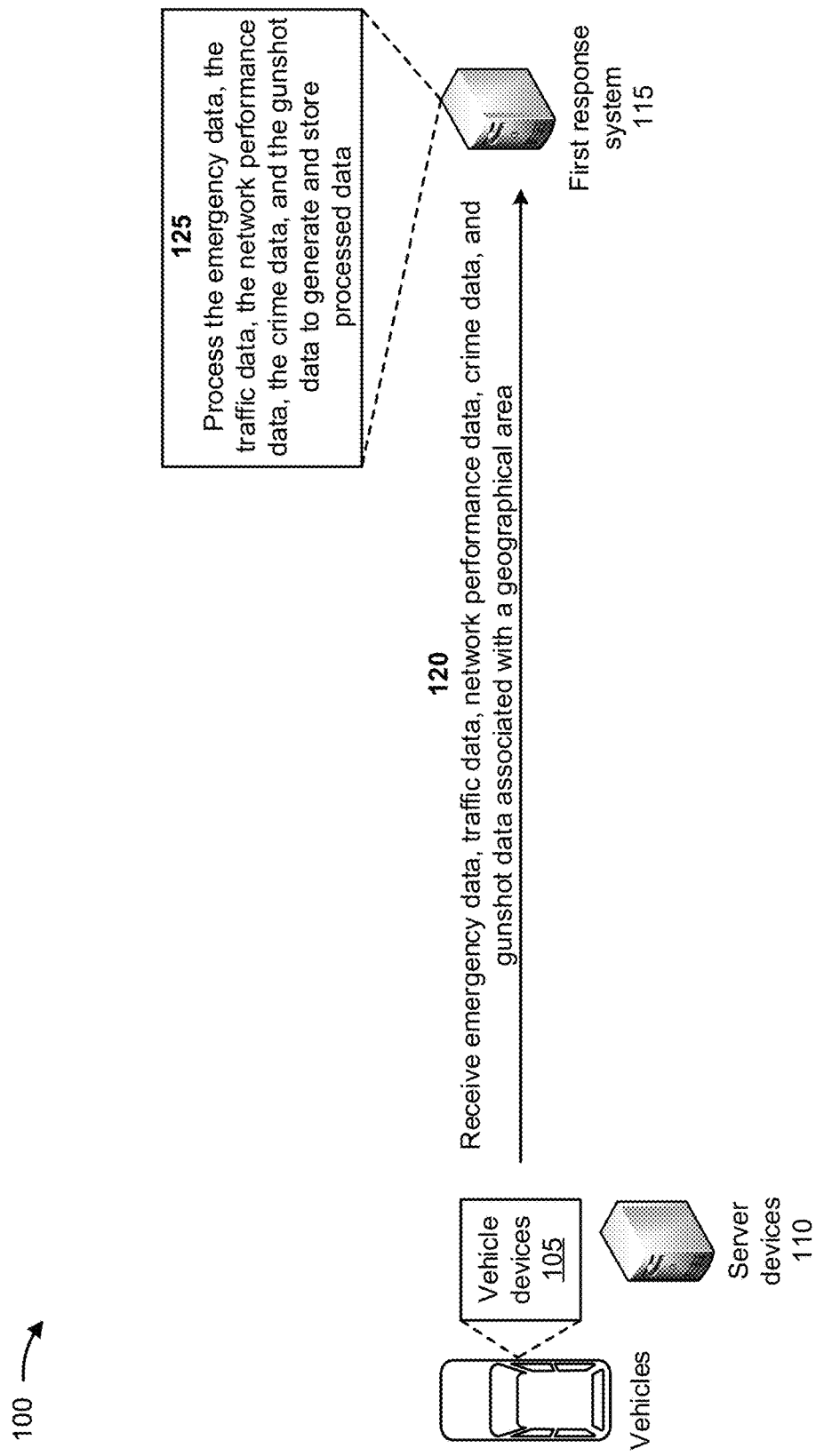
FIGS. 1A-1F are diagrams of an example associated with autonomous first response routing for improved public safety.

The following detailed description of example implementations refers to the accompanying drawings. The same reference numbers in different drawings may identify the same or similar elements.

Geographical areas (e.g., neighborhoods) may receive services associated with deliveries, repairs, policing, emergencies, and/or the like. For example, current police operating procedures call for officers to maintain a beat or a designated patrol area. Assignments to designated patrol areas are often based on intuition (e.g., associated with classifying riskiness of geographical locations) rather than on data and require a significant allocation of officers and resources to cover a given area. When on a designated patrol area assignment, officers are unable to complete other tasks of value, such as mentoring in a community, carrying out investigations, completing learning and training opportunities, and/or the like. Classifying riskiness of geographical locations presents the same issues for other services, such as emergency services, delivery services, repair services, and/or the like. Thus, current techniques for classifying risk of geographical locations consume computing resources (e.g., processing resources, memory resources, communication resources, and/or the like), networking resources, transportation resources, and/or other resources associated with traveling to and providing a service to a designated areas that may include less criminal activities than other designated areas, incorrectly assigning designating areas, handling increased crime in non-designated areas, improperly carrying out investigations, handling lawsuits associated with lack of training, and/or the like.

Some implementations described herein provide a first response system that provides autonomous first response routing for improved public safety. For example, the first response system may receive emergency data, traffic data, network performance data, crime data, and gunshot data associated with a geographical area and may process the emergency data, the traffic data, the network performance data, the crime data, and the gunshot data, with a risk classifier model, to identify a location within the geographical area. The first response system may utilize the risk classifier model to determine, based on the emergency data, the traffic data, the network performance data, the crime data, and the gunshot data for the location, a risk level for the location and may process the risk level, the traffic data, and the network performance data for the location, with a deployable location model, to identify an autonomous vehicle to deploy to the location. The first response system may process the traffic data and the network performance data for the location, with the deployable location model, to determine a route for the autonomous vehicle to travel to the location and may perform one or more actions based on the autonomous vehicle and the route.

In this way, the first response system provides autonomous first response routing for improved public safety. For example, the first response system may deploy available autonomous vehicles to designated patrol areas instead of officers and may intelligently deploy the autonomous vehicles. This may enable a quantity of fully autonomous officer-less vehicles to be on patrol in designated patrol areas. The first response system may identify designated patrol areas for the autonomous vehicles based on historical emergency risk data, locations of other autonomous vehicles and human first responders, gunshot detection data, and/or the like. Having a visible police presence is a crime deterrent and the autonomous vehicles may provide significant value in emergencies of varying types. For example, cameras of the autonomous vehicles may be used to facilitate operational awareness or serve as probes, hardware of the autonomous vehicles may add network capacity for other first responders, the autonomous vehicles may be used for public communication, the autonomous vehicles may be used to control or divert traffic away from an emergency, and/or the like.

Thus, implementations described herein may conserve computing resources, networking resources, transportation resources, and other resources that would have otherwise been consumed by traveling to and providing a service to a designated areas that may include less criminal activities than other designated areas, incorrectly assigning designating areas, handling increased crime in non-designated areas, improperly carrying out investigations, handling lawsuits associated with lack of training, and/or the like.

FIGS. 1A-1F are diagrams of an example 100 associated with autonomous first response routing for improved public safety. As shown in FIGS. 1A-1F, example 100 includes vehicle devices 105 (associated with vehicles), server devices 110, and a first response system 115. Further details of the vehicle devices 105, the server devices 110, and the first response system 115 are provided elsewhere herein.

As shown in FIG. 1A, and by reference number 120, the first response system 115 may receive, from the vehicle devices 105 and/or the server devices 110, emergency data, traffic data, network performance data, crime data, and gunshot data associated with a geographical area. The emergency data may be received from an emergency dispatch system and may include, for each emergency dispatch, data identifying one or more of an emergency geographical address, an emergency reporter name, an emergency reporter contact information, an incident priority, an emergency call recording, a location with police officers, a suspect vehicle, and/or the like. The traffic data may be received from a traffic data system and may include one or more of live traffic data, historical traffic data, and/or the like. The network performance data may be received from a network service provider system and may include data identifying one or more of real-time network performance, historical network performance, key performance indicator degradation, network alarms, and/or the like. The crime data may be received from a records management system and may include data identifying one or more of arrests, paroles, open cases, historical crimes, and/or the like. The gunshot data may be received from a gunshot detection system and may include data identifying one or more of locations of real-time gunshots, historical gunshot locations and times, and/or the like.

As further shown in FIG. 1A, and by reference number 125, the first response system 115 may process the emergency data, the traffic data, the network performance data, the crime data, and the gunshot data to generate and store processed data. In some implementations, the first response system 115 may store the processed data in a data structure (e.g., a database, a table, a list, and/or the like) associated with the first response system 115. In some implementations, the first response system 115 may process the emergency data, the traffic data, the network performance data, the crime data, and the gunshot data to generate the processed data by parsing the emergency data, the traffic data, the network performance data, the crime data, and the gunshot data to generate parsed data in a particular format (e.g., a format understood by the models described elsewhere herein). The first response system 115 may perform data cleansing of the parsed data to generate the processed data. In some implementations, the data cleansing may ensure an accuracy of the parsed data and/or the processed data. The data cleansing may include detecting and correcting (or removing) corrupt or inaccurate records from the parsed data; identifying incomplete, incorrect, inaccurate or irrelevant parts of the parsed data and then replacing, modifying, or deleting dirty or coarse data; and/or the like.

Figure 1B:
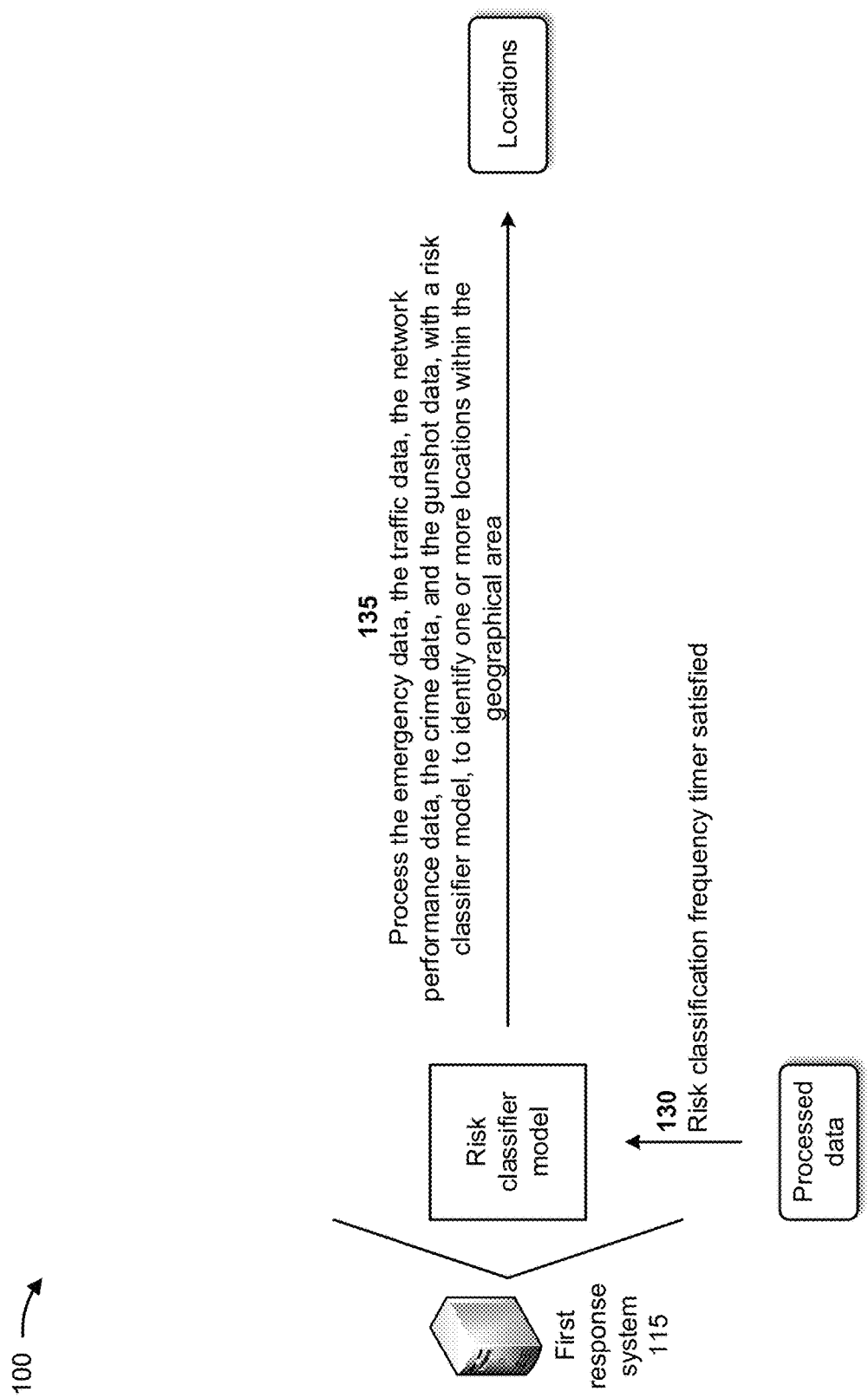

As shown in FIG. 1B, and by reference number 130, the first response system 115 may determine that a risk classification frequency is satisfied. In some implementations, the risk classification frequency may include a risk classification frequency timer that is satisfied after a particular time period (e.g., in hours, days, weeks, and/or the like). The first response system 115 may determine whether the risk classification frequency timer has been satisfied (e.g., exceeded) before processing the emergency data, the traffic data, the network performance data, the crime data, and/or the gunshot data with one or more models, described elsewhere herein. In some implementations, the risk classification frequency timer may be set for twenty-four hours and the first response system 115 may process risk entries each time the risk frequency timer is satisfied.

As further shown in FIG. 1B, and by reference number 135, the first response system 115 may process the emergency data, the traffic data, the network performance data, the crime data, and the gunshot data, with a risk classifier model, to identify one or more locations within the geographical area. For example, when processing the emergency data, the traffic data, the network performance data, the crime data, and the gunshot data, with the risk classifier model, to identify the one or more locations within the geographical area, the first response system 115 may determine or receive a location sizing parameter to define a size of each of the one or more locations. In some implementations, the location sizing parameter may the same for each of the one or more locations, different for each of the one or more locations, and/or the like. In one example, the location sizing parameter may define the size as a quantity (e.g., ten, twenty, thirty, and/or the like) of addresses within the geographical area. The first response system 115 may identify the one or more locations within the geographical area based on the size defined for the location by the locating sizing parameter. Returning to the previous example, each of the one or more locations may include the quantity of addresses within the geographical area. Thus, more densely populated locations (e.g., with a greater quantity of addresses) may be smaller in geographical size than less densely populated locations (e.g., with a lesser quantity of addresses).

In some implementations, the first response system 115 may identify the emergency data, the traffic data, the network performance data, the crime data, and the gunshot data, associated with the addresses within the geographical area, and may define the one or more locations within the geographical area based on identifying identify the emergency data, the traffic data, the network performance data, the crime data, and the gunshot data associated with the addresses.

In some implementations, when processing the emergency data, the traffic data, the network performance data, the crime data, and the gunshot data, with the risk classifier model, to identify the one or more locations within the geographical area, the first response system 115 may determine whether the risk classification frequency timer is satisfied. The first response system 115 may process the emergency data, the traffic data, the network performance data, the crime data, and the gunshot data, with the risk classifier model, to identify the one or more locations within the geographical area, based on the risk classification frequency timer being satisfied.

In some implementations, the first response system 115 may combine individual risk entries into a "risk block" of addresses with a size that is determined based on a house number grid parameter (e.g., a quantity of risk entries into blocks of one-hundred addresses). The first response system 110 may analyze each risk block of addresses by analyzing a quantity and types of crime incidents in a given risk block, and may compare the quantity and the types of crime incidents to a preset risk classification logic table. The first response system 115 may output a file (e.g., a table) that represents a risk level per risk block (e.g., for one-hundred street addresses). The first response system 115 may initially define parameters for categorizing crime risk, and over time may utilize machine learning to modify these parameters to better visualize risk level output based on a normal bell curve distribution. For example, for the risk of "crime," red may correspond to "high crime," orange may correspond to "moderate crime," yellow may correspond to "marginal crime," and green may correspond to "low crime." Geographical zones may be further rated based on time of day. For example, a residential zone may be designated a yellow zone from 8 am-8 pm and a red zone 8 pm-8 am.

Figure 1C:
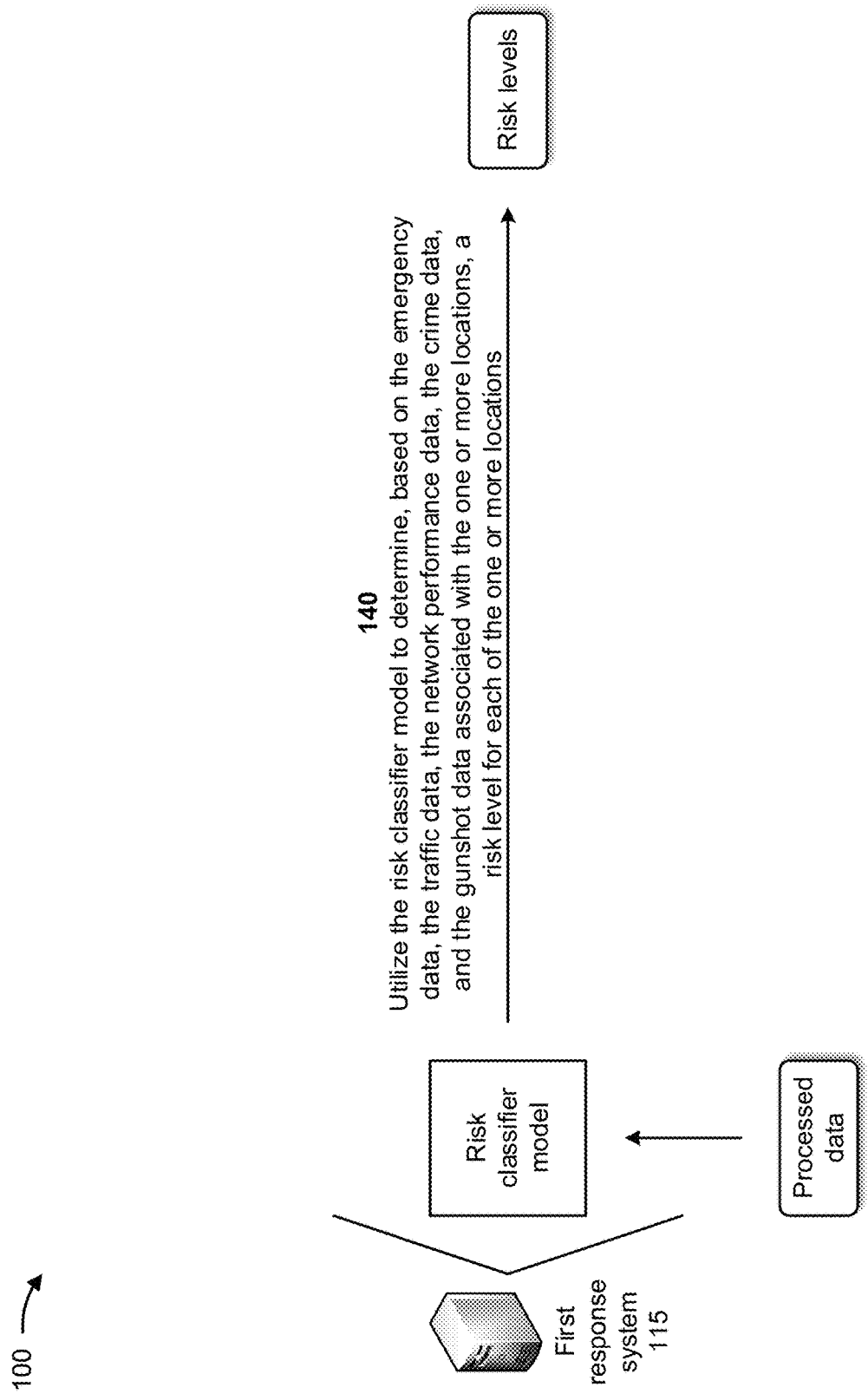

As shown in FIG. 1C, and by reference number 140, the first response system 115 may utilize the risk classifier model to determine, based on the emergency data, the traffic data, the network performance data, the crime data, and the gunshot data associated with the one or more locations, a risk level for each of the one or more locations. For example, when utilizing the risk classifier model to determine, based on the emergency data, the traffic data, the network performance data, the crime data, and the gunshot data associated with the one or more locations, the risk level for each of the one or more locations, the first response system 115 may determine risk levels associated with the emergency data, the traffic data, the network performance data, the crime data, and the gunshot data for each of the one or more locations. The first response system 115 may assign weights to the risk levels, for each of the one or more locations, to generate weighted risk levels and may combine the weighted risk levels to determine the risk level for each of the one or more locations.

In some implementations, to determine a risk level for a location of the one or more locations, the first response system 115 utilizes the risk classifier model to count, over a time period, incidents identified in the emergency data, the traffic data, the network performance data, the crime data, and the gunshot data associated with the location. The time period may be in minutes, an hour, hours, and/or the like. The count of the incidents may provide an indication of the risk level for the location. For example, the greater the count of incidents at the location, the greater the risk level may be for the location. In some implementations, the first response system 115 may apply weights to the incidents based on types associated with the incidents. For example, network performance incidents may be allocated a lesser weight than criminal incidents since network performance may not be as life threatening as criminal incidents. The weights may enable the count of incidents to provide a more realistic indication of the risk level for the location.

Figure 1D:
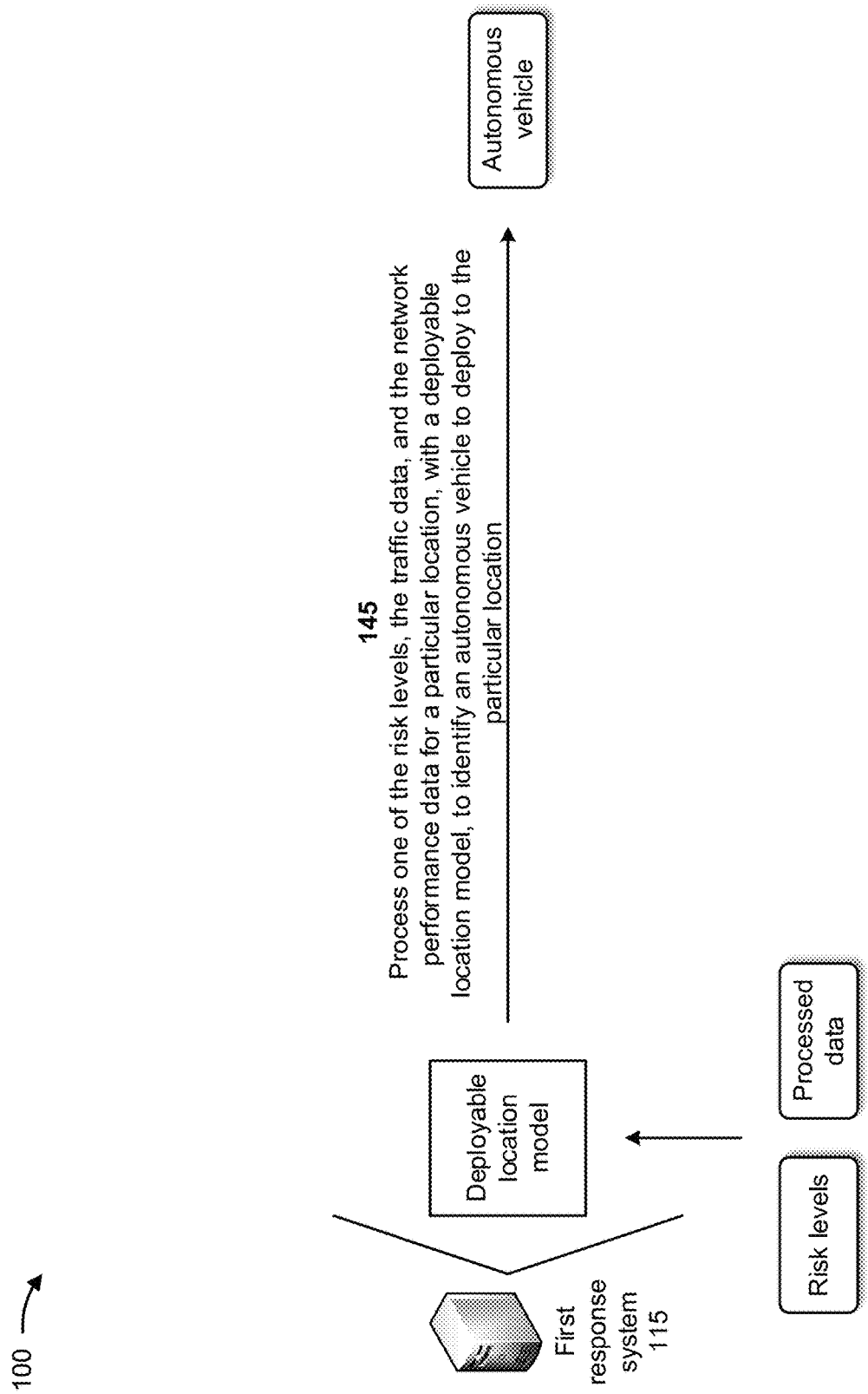

As shown in FIG. 1D, and by reference number 145, the first response system 115 may process one of the risk levels, the traffic data, and the network performance data for a particular location, with a deployable location model, to identify an autonomous vehicle to deploy to the particular location. The first response system 115 may continuously track locations and current status (e.g., being utilized or unutilized) of autonomous vehicles that are deployable in the geographical area. The first response system 115 may process the one of the risk levels, the traffic data, and the network performance data for the particular location, with the deployable location model, to determine a quantity of autonomous vehicles to deploy to the particular location and to identify available autonomous vehicles closest to the particular location. For example, if the first response system 115 determines that one autonomous vehicle is to be deployed to the particular location, the first response system 115 may identify the closest available autonomous vehicle to the particular location.

In one example, if an emergency occurs on a bridge at the particular location, the first response system 115 may identify the emergency based on the emergency data and may determine traffic conditions at the bridge based on the traffic data. The first response system 115 may identify the two closest autonomous vehicles to the bridge and may direct them to either side of the bridge to form a roadblock that directs traffic away from the bridge.

In another example, the first response system 115 may output routes to maximize coverage of the highest crime zones, making most efficient use of number of deployable assets (e.g., vehicles) available. Location services agents within the vehicles may receive routing instructions and may execute the routing instructions.

The autonomous vehicle may include an autonomous motor vehicle, a semi-autonomous motor vehicle, a robot, an unmanned aerial vehicle, and/or the like. The autonomous vehicle may be equipped with emergency response hardware, one or more cameras, gunshot detection sensors, one or more digital displays, a personal announcement system, a vehicle bus interface to receive and execute routing instructions, storage compartments for medical supplies, food, and/or water, and/or the like. The cameras may be utilized to facilitate operational awareness or serve as probes, the emergency response hardware may be utilized to add network capacity for other first responders, the personal announcement system may be utilized for public communication, the autonomous vehicle may be utilized to control or divert traffic away from an emergency, and/or the like. The first response system 115 may select the autonomous vehicle based on the emergency and the equipment required for the emergency. For example, the first response system 115 may select an unmanned aerial vehicle with a camera to fly over a riot situation, may select an autonomous motor vehicle with components to provide medical supplies to fire victims, and/or the like.

Figure 1E:
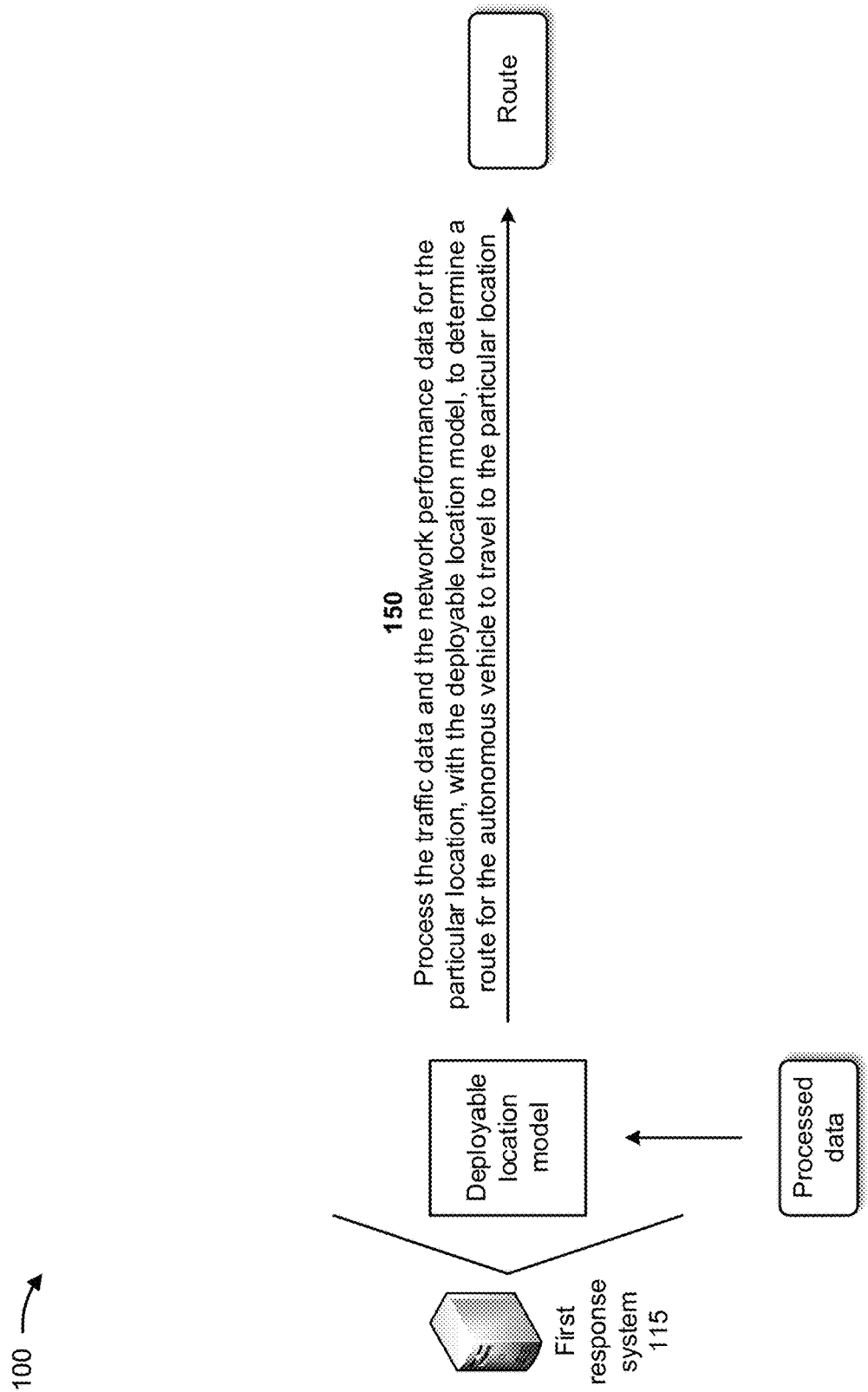

As shown in FIG. 1E, and by reference number 150, the first response system 115 may process the traffic data and the network performance data for the particular location, with the deployable location model, to determine a route for the autonomous vehicle to travel to the particular location. The first response system 115 may utilize the traffic data to identify an optimal route for the autonomous vehicle (e.g., or another type of vehicle, such as a non-autonomous vehicle) to travel to the particular location. The optimal route may include routing information that vehicle interface bus of the autonomous vehicle may interpret and execute to cause the autonomous vehicle to travel to the particular location. The optimal route may make the most efficient use of the quantities and types of autonomous vehicles available for the particular location. The first response system 115 may factor in crime (e.g., the crime data), time of day, the network performance data (e.g., for tracking the autonomous vehicle), and/or the like when generating the optimal route. The first response system 115 may utilize the network performance data to track progress of the autonomous vehicle as the autonomous vehicle travels to the particular location.

In some implementations, the first response system 115 may analyze street-by-street output for the particular location and may overlay environmental factors, such as hourly traffic speed, road quality, usual delays, and/or the like, when determining the route for the autonomous vehicle to travel to the particular location. In some implementations, the first response system 115 may utilize Geographic Information System (GIS) mapping or another mapping technique to generate the route for the autonomous vehicle to travel to the particular location.

Figure 1F:
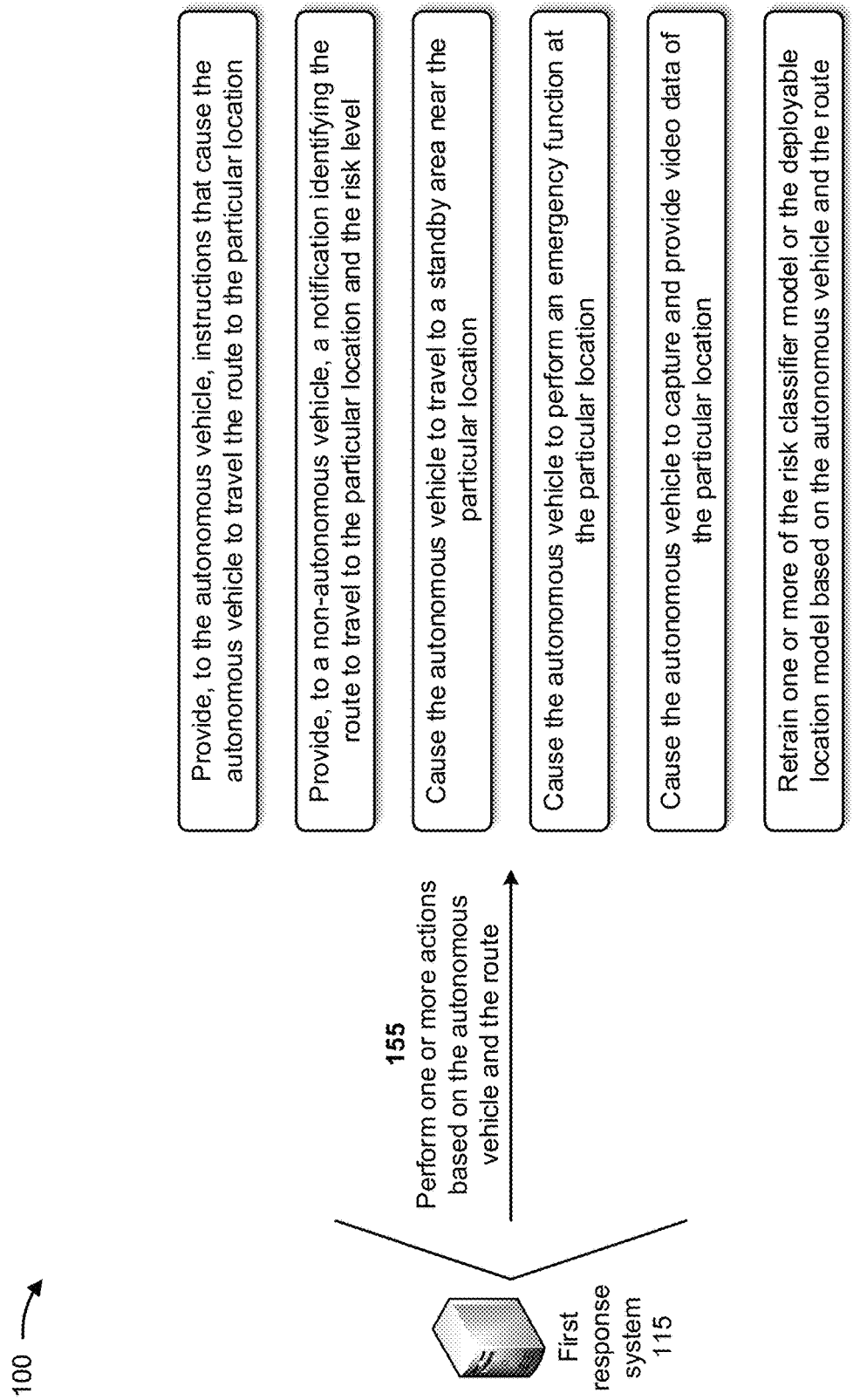

As shown in FIG. 1F, and by reference number 155, the first response system 115 may perform one or more actions based on the identified autonomous vehicle and the route. For example, the one or more actions may include the first response system 115 providing, to the autonomous vehicle, instructions that cause the autonomous vehicle to travel the route to the particular location. The autonomous vehicle may receive and execute the instructions in order to travel the route to the particular location. In this way, the first response system 115 may quickly deploy the autonomous vehicle to an emergency and may conserve computing resources, networking resources, transportation resources, and other resources that would have otherwise been consumed by traveling to and patrolling designated patrol areas that are not as risky as other designated patrol areas, incorrectly assigning designating patrol areas, handling increased crime in non-designated patrol areas, and/or the like.

In some implementations, the one or more actions include the first response system 115 providing, to a manned vehicle, a notification identifying the route to travel to the particular location and the risk level for the particular location. For example, if there are no autonomous vehicles available, the first response system 115 may provide, to the manned vehicle, the notification identifying the route to travel to the particular location and the risk level for the particular location. The emergency personnel associated with the manned vehicle may utilize the notification to travel to the particular location in the manned vehicle. In this way, the first response system 115 may conserve computing resources, networking resources, transportation resources, and other resources that would have otherwise been consumed by traveling to and patrolling designated patrol areas that may include less criminal activities than other designated patrol areas, incorrectly assigning designating patrol areas, handling increased crime in non-designated patrol areas, and/or the like.

In some implementations, the one or more actions include the first response system 115 causing the autonomous vehicle to travel to a standby area near the particular location. For example, the first response system 115 may provide, to the autonomous vehicle, instructions that cause the autonomous vehicle to travel to the standby area near the particular location. The autonomous vehicle may receive and execute the instructions in order to travel to the standby area near the particular location. The standby area may be designated when an emergency has not occurred but is expected to occur in the near future. In this way, the autonomous vehicle is ready to be quickly deployed to address the emergency. This may conserve computing resources, networking resources, transportation resources, and other resources that would have otherwise been consumed by traveling longer distances to an emergency after an emergency occurs, not capturing a criminal due to not having the autonomous vehicle ready in the standby area, and/or the like.

In some implementations, the one or more actions include the first response system 115 causing the autonomous vehicle to perform an emergency function at the particular location. For example, the first response system 115 may cause the autonomous vehicle to travel with medical supplies to the particular location so that the medical supplies may be utilized for injured victims. In this way, the first response system 115 may conserve computing resources, networking resources, transportation resources, and other resources that would have otherwise been consumed by redesignating manned patrol vehicles to travel to the particular location with the medical supplies, handling increased crime in patrol areas being patrolled by the redesignated manned patrol vehicles, and/or the like.

In some implementations, the one or more actions include the first response system 115 causing the autonomous vehicle to capture and provide video data of the particular location. For example, the first response system 115 may dispatch an unmanned aerial vehicle to capture overhead video of a potential robbery and may cause autonomous vehicles or manned vehicles to be dispatched to the particular location if the captured video indicates that a robbery is in progress. In this way, the first response system 115 may conserve computing resources, networking resources, transportation resources, and other resources that would have otherwise been consumed by traveling to and patrolling designated patrol areas that may include less criminal activities than other designated patrol areas, incorrectly assigning designating patrol areas, handling increased crime in non-designated patrol areas, and/or the like.

In some implementations, the one or more actions include the first response system 115 retraining one or more of the risk classifier model or the deployable location model based on the autonomous vehicle and the route. The first response system 115 may utilize the identified autonomous vehicle and the route as additional training data for retraining the one or more of the risk classifier model or the deployable location model, thereby increasing the quantity of training data available for training the one or more of the risk classifier model or the deployable location model. Accordingly, the first response system 115 may conserve computing resources associated with identifying, obtaining, and/or generating historical data for training the one or more of the risk classifier model or the deployable location model relative to other systems for identifying, obtaining, and/or generating historical data for training machine learning models.

In this way, the first response system 115 provides autonomous first response routing for improved public safety. For example, the first response system 115 may deploy available autonomous vehicles to designated patrol areas instead of officers and may intelligently deploy the autonomous vehicles. This may enable a quantity of fully autonomous officer-less vehicles to be on patrol in designated patrol areas. The first response system 115 may identify designated patrol areas for the autonomous vehicles based on historical emergency risk data, locations of other autonomous vehicles and human first responders, gunshot detection data, and/or the like. Having a visible police presence is a crime deterrent and the autonomous vehicles may provide significant value in emergencies of varying types. For example, cameras of the autonomous vehicles may be used to facilitate operational awareness or serve as probes, hardware of the autonomous vehicles may add network capacity for other first responders, the autonomous vehicles may be used for public communication, the autonomous vehicles may be used to control or divert traffic away from an emergency, and/or the like. Thus, implementations described herein may conserve computing resources, networking resources, transportation resources, and other resources that would have otherwise been consumed by traveling to and patrolling designated patrol areas that may include less criminal activities than other designated patrol areas, incorrectly assigning designating patrol areas, handling increased crime in non-designated patrol areas, improperly carrying out investigations, handling lawsuits associated with lack of training, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
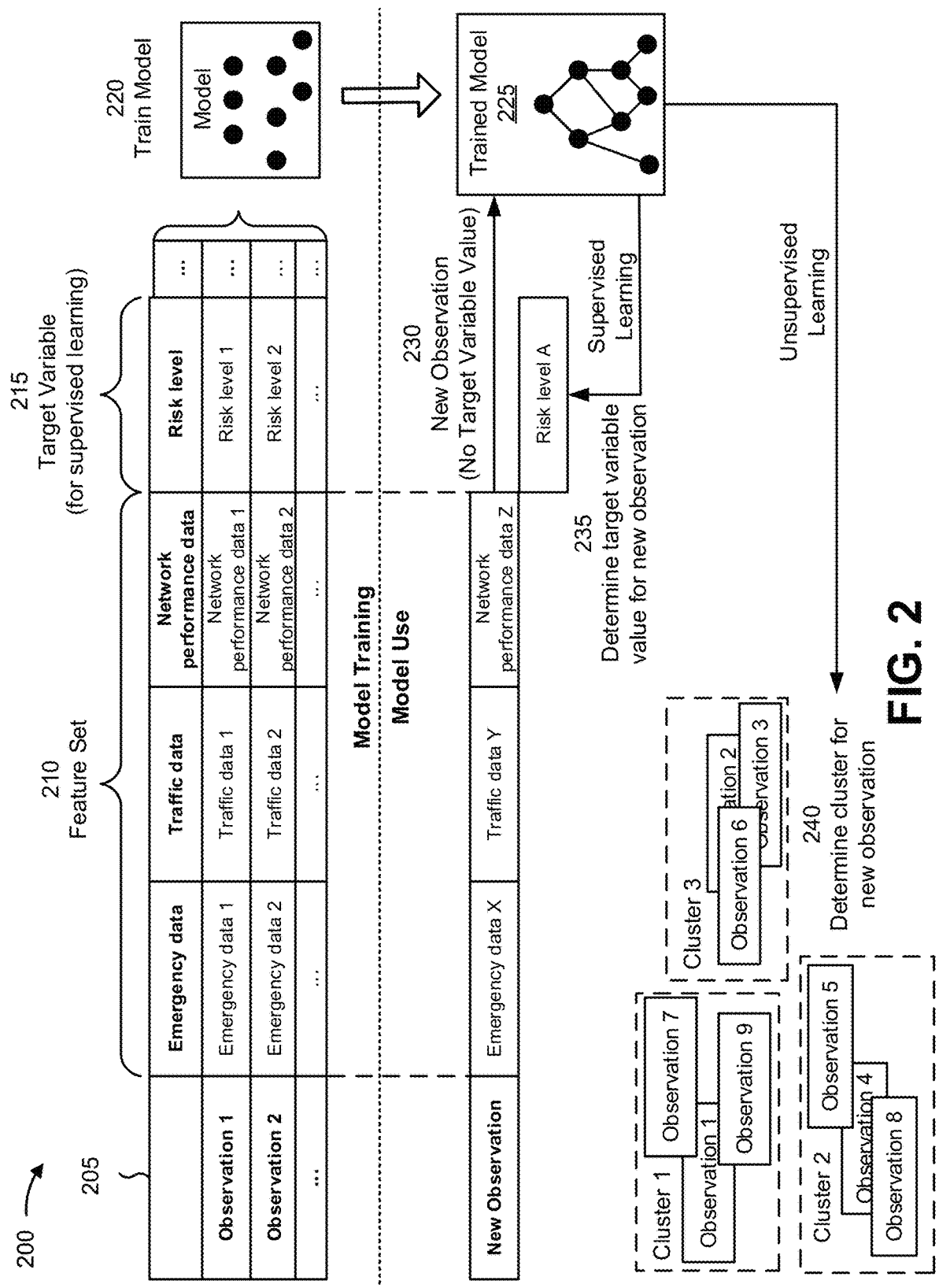
FIG. 2 is a diagram illustrating an example of training and using a machine learning model in connection with autonomous first response routing for improved public safety.

FIG. 2 is a diagram illustrating an example 200 of training and using a machine learning model in connection with autonomous first response routing for improved public safety. The machine learning model training and usage described herein may be performed using a machine learning system. The machine learning system may include or may be included in a computing device, a server, a cloud computing environment, and/or the like, such as the first response system 115 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the first response system 115, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the first response system 115. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of emergency data, a second feature of traffic data, a third feature of network performance data, and so on. As shown, for a first observation, the first feature may have a value of emergency data 1, the second feature may have a value of traffic data 1, the third feature may have a value of network performance data 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable is a risk level, which has a value of risk level 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of emergency data X, a second feature of traffic data Y, a third feature of network performance data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of risk level A for the target variable of the risk level for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., an emergency data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a traffic data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to provide autonomous first response routing for improved public safety. The machine learning system enables recognition and/or identification of tens, hundreds, thousands, or millions of features and/or feature values for tens, hundreds, thousands, or millions of observations, thereby increasing accuracy and consistency and reducing delay associated with autonomous first response routing for improved public safety relative to requiring computing resources to be allocated for tens, hundreds, or thousands of operators to manually providing first response routing for improved public safety.

As indicated above, FIG. 2 is provided as an example. Other examples may differ from what is described in connection with FIG. 2.

Figure 3:
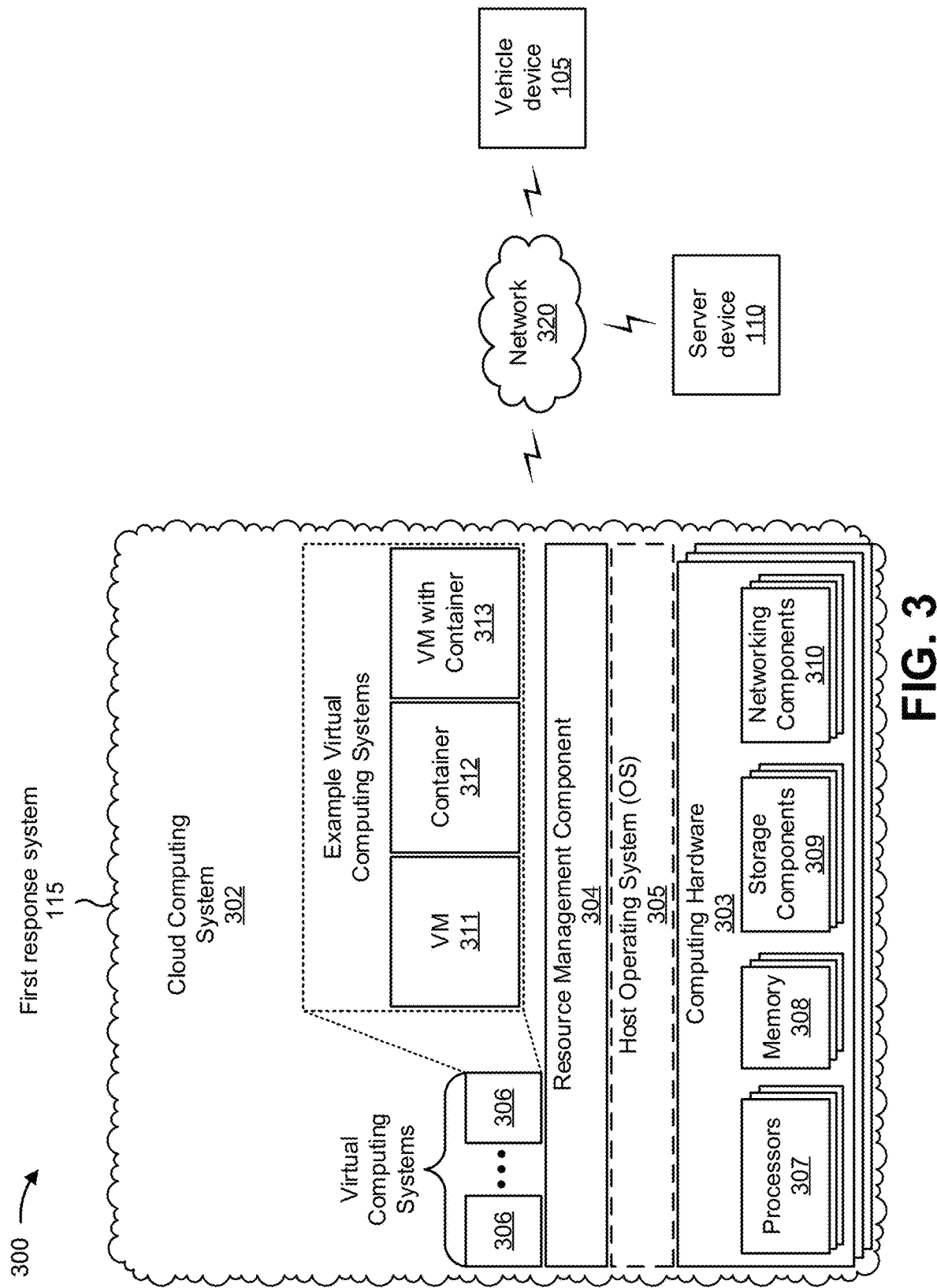
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include the first response system 115, which may include one or more elements of and/or may execute within a cloud computing system 302. The cloud computing system 302 may include one or more elements 303-313, as described in more detail below. As further shown in FIG. 3, environment 300 may include the vehicle device 105, the server device 110, and/or a network 320. Devices and/or elements of environment 300 may interconnect via wired connections and/or wireless connections.

The vehicle device 105 includes devices capable of receiving, generating, storing, processing, and/or providing information, as described elsewhere herein. The vehicle device 105 may include a communication device and/or a computing device. For example, the vehicle device 105 may include a telematics device, a video camera, a dashboard camera, an inertial measurement unit, a three-axis accelerometer, a gyroscope, a global positioning system (GPS) device, an on-board diagnostics (OBD) device, a vehicle tracking unit, an electronic control unit (ECU), an in-vehicle infotainment system, a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), among other examples.

The server device 110 includes one or more devices capable of receiving, generating, storing, processing, providing, and/or routing information, as described elsewhere herein. The server device 110 may include a communication device and/or a computing device. For example, the server device 110 may include a server, such as an application server, a client server, a web server, a database server, a host server, a proxy server, a virtual server (e.g., executing on computing hardware), or a server in a cloud computing system. In some implementations, the server device 110 includes computing hardware used in a cloud computing environment.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, or a hybrid environment 313 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the first response system 115 may include one or more elements 303-313 of the cloud computing system 302, may execute within the cloud computing system 302, and/or may be hosted within the cloud computing system 302, in some implementations, the first response system 115 may not be cloud-based (e.g., may be implemented outside of a cloud computing system) or may be partially cloud-based. For example, the first response system 115 may include one or more devices that are not part of the cloud computing system 302, such as device 400 of FIG. 4, which may include a standalone server or another type of computing device. The first response system 115 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

FIG. 4 is a diagram of example components of a device 400, which may correspond to the vehicle device 105, the server device 110, and/or the first response system 115. In some implementations, the vehicle device 105, the server device 110, and/or the first response system 115 may include one or more devices 400 and/or one or more components of the device 400. As shown in FIG. 4, the device 400 may include a bus 410, a processor 420, a memory 430, a storage component 440, an input component 450, an output component 460, and a communication component 470.

The bus 410 includes a component that enables wired and/or wireless communication among the components of the device 400. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform a function. The memory 430 includes a random-access memory, a read only memory, and/or another type of memory (e.g., a flash memory, a magnetic memory, and/or an optical memory).

The storage component 440 stores information and/or software related to the operation of the device 400. For example, the storage component 440 may include a hard disk drive, a magnetic disk drive, an optical disk drive, a solid-state disk drive, a compact disc, a digital versatile disc, and/or another type of non-transitory computer-readable medium. The input component 450 enables the device 400 to receive input, such as user input and/or sensed inputs. For example, the input component 450 may include a touch screen, a keyboard, a keypad, a mouse, a button, a microphone, a switch, a sensor, a global positioning system component, an accelerometer, a gyroscope, and/or an actuator. The output component 460 enables the device 400 to provide output, such as via a display, a speaker, and/or one or more light-emitting diodes. The communication component 470 enables the device 400 to communicate with other devices, such as via a wired connection and/or a wireless connection. For example, the communication component 470 may include a receiver, a transmitter, a transceiver, a modem, a network interface card, and/or an antenna.

The device 400 may perform one or more processes described herein. For example, a non-transitory computer-readable medium (e.g., the memory 430 and/or the storage component 440) may store a set of instructions (e.g., one or more instructions, code, software code, and/or program code) for execution by the processor 420. The processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for autonomous first response routing for improved public safety. In some implementations, one or more process blocks of FIG. 5 may be performed by a device (e.g., the first response system 115). In some implementations, one or more process blocks of FIG. 5 may be performed by another device or a group of devices separate from or including the device, such as a vehicle device (e.g., the vehicle device 105) and/or a server device (e.g., the server device 110). Additionally, or alternatively, one or more process blocks of FIG. 5 may be performed by one or more components of the device 400, such as the processor 420, the memory 430, the storage component 440, the input component 450, the output component 460, and/or the communication component 470.

As shown in FIG. 5, process 500 may include receiving emergency data, traffic data, network performance data, crime data, and gunshot data associated with a geographical area (block 510). For example, the device may receive emergency data, traffic data, network performance data, crime data, and gunshot data associated with a geographical area, as described above. In some implementations, the emergency data includes data identifying one or more of an emergency geographical address, an emergency reporter name, an emergency reporter contact information, an incident priority, an emergency call recording, a location with police officers, or a suspect vehicle; the traffic data includes one or more of live traffic data or historical traffic data; the network performance data includes data identifying one or more of real-time network performance, historical network performance, key performance indicator degradation, or network alarms; the crime data includes data identifying one or more of arrests, paroles, open cases, or historical crimes; and gunshot data includes data identifying locations of real-time gunshots or historical gunshot locations and times.

As further shown in FIG. 5, process 500 may include determining based on the emergency data, the traffic data, the network performance data, the crime data, and the gunshot data, and using a risk classifier model, a risk level for a location within the geographical area (block 520). For example, the device may determine based on the emergency data, the traffic data, the network performance data, the crime data, and the gunshot data, and using a risk classifier model, a risk level for a location within the geographical area, as described above. In some implementations, the location is a street within the geographic location. In some implementations, the risk level is associated with one or more of one or more fires, one or more crimes, one or more vehicle accidents, or one or more traffic violations. In some implementations, the risk level may include one of a first risk level, a second risk level that is less than the first risk level, a third risk level that is less than the second risk level, or a fourth risk level that is less than the third risk level.

In some implementations, determining, based on the emergency data, the traffic data, the network performance data, the crime data, and the gunshot data associated with the location, and using the risk classifier model, the risk level for the location includes utilizing a location sizing parameter to define a size of the location, and identifying the location within the geographical area based on the size defined for the location.

In some implementations, determining, based on the emergency data, the traffic data, the network performance data, the crime data, and the gunshot data associated with the location, and using the risk classifier model, the risk level for the location includes determining risk levels associated with the emergency data, the traffic data, the network performance data, the crime data, and the gunshot data for the location, assigning weights to the risk levels to generate weighted risk levels, and combining the weighted risk levels to determine the risk level.

As further shown in FIG. 5, process 500 may include determining based on the risk level, the traffic data, and the network performance data for the location, and using a deployable location model, an autonomous vehicle to deploy to the location (block 530). For example, the device may determine based on the risk level, the traffic data, and the network performance data for the location, and using a deployable location model, an autonomous vehicle to deploy to the location, as described above.

As further shown in FIG. 5, process 500 may include determining based on the traffic data and the network performance data for the location, and using the deployable location model, a route for the autonomous vehicle to travel to the location (block 540). For example, the device may determine based on the traffic data and the network performance data for the location, and using the deployable location model, a route for the autonomous vehicle to travel to the location, as described above.

As further shown in FIG. 5, process 500 may include performing one or more actions based on the autonomous vehicle and the route (block 550). For example, the device may perform one or more actions based on the autonomous vehicle and the route, as described above. In some implementations, performing the one or more actions includes generating a risk report that identifies the location and the risk level for the location, generating a risk visualization map based on the risk report, and providing the risk report and the risk visualization map for display.

In some implementations, performing the one or more actions includes one or more of providing, to the autonomous vehicle, instructions that cause the autonomous vehicle to travel the route to the location; providing, to a non-autonomous vehicle, a notification identifying the route to travel to the location and the risk level for the location; or causing the autonomous vehicle to travel to a standby area near the location.

In some implementations, performing the one or more actions includes one or more of causing the autonomous vehicle to perform an emergency function at the location, causing the autonomous vehicle to capture and provide video data of the location, or retraining one or more of the risk classifier model or the deployable location model based on the autonomous vehicle and the route.

In some implementations, performing the one or more actions includes one or more of causing a camera of the autonomous vehicle to capture video of the location, causing hardware of the autonomous vehicle to provide additional network capacity for first responders, causing the autonomous vehicle to be utilized for public communication, or causing the autonomous vehicle to control or divert traffic away from an emergency.

In some implementations, process 500 includes parsing the emergency data, the traffic data, the network performance data, the crime data, and the gunshot data to generate parsed data in a particular format; performing data cleansing of the parsed data to generate processed data; and storing the processed data in a data structure.

In some implementations, process 500 includes determining whether a risk classification timer is satisfied, and identifying, based on the emergency data, the traffic data, the network performance data, the crime data, and the gunshot data, and using the risk classifier model, the location within the geographical area, based on the risk classification timer being satisfied.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, data associated with a geographical area,
      wherein the data includes emergency data, traffic data, network performance data, crime data, and gunshot data;
   determining, by the device, a location sizing parameter that defines a size of a location within the geographical area as a quantity of addresses within the geographical area;
   determining, by the device, based on identifying the location and based on applying weights to incidents identified by the data, and using a risk classifier model, a risk level for the location,
      wherein the weights indicate that a weight of a criminal incident, identified by the crime data, is greater than a weight of a network performance incident, identified by the network performance data;
   determining, by the device, based on the risk level, the traffic data, and the network performance data, and using a deployable location model, an autonomous vehicle to deploy to the location;
   determining, by the device, based on the traffic data and the network performance data, and using the deployable location model, a route for the autonomous vehicle to travel to the location; and
   performing, by the device, one or more actions based on the autonomous vehicle and the route.

2. The method of claim 1, wherein the location is a street within the geographical area.

3. The method of claim 1, further comprising:
   parsing the emergency data, the traffic data, the network performance data, the crime data, and the gunshot data to generate parsed data in a particular format;
   performing data cleansing of the parsed data to generate processed data; and
   storing the processed data in a data structure.

4. The method of claim 1, further comprising:
   determining whether a risk classification timer is satisfied; and
   identifying the location based on the risk classification timer being satisfied.

5. The method of claim 1, wherein the risk level is associated with one or more of:
   one or more fires,
   one or more crimes,
   one or more vehicle accidents, or
   one or more traffic violations.

6. The method of claim 1, wherein the risk level may include one of:
   a first risk level,
   a second risk level that is less than the first risk level,
   a third risk level that is less than the second risk level, or
   a fourth risk level that is less than the third risk level.

7. The method of claim 1, wherein the emergency data includes data identifying one or more of an emergency geographical address, an emergency reporter name, an emergency reporter contact information, an incident priority, an emergency call recording, a location with police officers, or a suspect vehicle;
   wherein the traffic data includes one or more of live traffic data or historical traffic data;
   wherein the network performance data includes data identifying one or more of real-time network performance, historical network performance, key performance indicator degradation, or network alarms;
   wherein the crime data includes data identifying one or more of arrests, paroles, open cases, or historical crimes; and
   wherein the gunshot data includes data identifying locations of real-time gunshots or historical gunshot locations and times.

8. A device, comprising:
   one or more processors configured to:
      receive data associated with a geographical area,
         wherein the data includes emergency data, traffic data, network performance data, crime data, and gunshot data;
      determine a location sizing parameter that defines a size of a location within the geographical area as a quantity of addresses within the geographical area;
      determine whether a risk classification timer is satisfied;
      identify, based on the location sizing parameter, the risk classification timer being satisfied, the data, and using a risk classifier model, the location;
      determine, based on applying weights to incidents identified by the data, and using the risk classifier model, a risk level for the location,
         wherein the weights indicate that a weight of a criminal incident, identified by the crime data, is greater than a weight of a network performance incident, identified by the network performance data;
      identify, based on the risk level, the traffic data, and the network performance data, and using a deployable location model, an autonomous vehicle to deploy to the location;
      determine, based on the traffic data and the network performance data, and using the deployable location model, a route for the autonomous vehicle to travel to the location; and
      perform one or more actions based on the autonomous vehicle and the route.

9. The device of claim 8, wherein the one or more processors, to determine the risk level for the location, are configured to:

determine risk levels associated with the data;
apply the weights to the risk levels to generate weighted risk levels; and
combine the weighted risk levels to determine the risk level.

10. The device of claim 8, wherein the one or more processors, to perform the one or more actions, are configured to:
generate a risk report that identifies the location and the risk level for the location;
generate a risk visualization map based on the risk report; and
provide the risk report and the risk visualization map for display.

11. The device of claim 8, wherein the one or more processors, to perform the one or more actions, are configured to one or more of:
provide, to the autonomous vehicle, instructions that cause the autonomous vehicle to travel the route to the location;
provide, to a non-autonomous vehicle, a notification identifying the route to travel to the location and the risk level for the location; or
cause the autonomous vehicle to travel to a standby area near the location.

12. The device of claim 8, wherein the one or more processors, to perform the one or more actions, are configured to one or more of:
cause the autonomous vehicle to perform an emergency function at the location;
cause the autonomous vehicle to capture and provide video data of the location; or
retrain one or more of the risk classifier model or the deployable location model based on the autonomous vehicle and the route.

13. The device of claim 8, wherein the one or more processors, to perform the one or more actions, are configured to one or more of:
cause a camera of the autonomous vehicle to capture video of the location;
cause hardware of the autonomous vehicle to provide additional network capacity for first responders;
cause the autonomous vehicle to be utilized for public communication; or
cause the autonomous vehicle to control or divert traffic away from an emergency.

14. The device of claim 8, wherein the device is a first response system.

15. A non-transitory computer-readable medium storing a set of instructions, the set of instructions comprising:
one or more instructions that, when executed by one or more processors of a device, cause the device to:
receive data associated with a geographical area,
wherein the data includes emergency data, traffic data, network performance data, crime data, and gunshot data;
determine a location sizing parameter that defines a size of a location within the geographical area as a quantity of addresses within the geographical area,
wherein the location is one of a plurality of locations within the geographical area that has the quantity of addresses;
identify, based on the data and the location sizing parameter, and using a risk classifier model, the plurality of locations;

determine, based on applying weights to incidents identified by the data, and using the risk classifier model, a plurality of risk levels corresponding to the plurality of locations,
wherein the weights indicate that a weight of a criminal incident, identified by the crime data, is greater than a weight of a network performance incident, identified by the network performance data;
identify, based on the traffic data and the network performance data, and using a deployable location model, a plurality of autonomous vehicles to deploy to the plurality of locations;
determine, based on the plurality of risk levels, the traffic data, and the network performance data, and using the deployable location model, a plurality of routes for the plurality of autonomous vehicles to travel to the plurality of locations; and
perform one or more actions based on the plurality of autonomous vehicles and the plurality of routes.

16. The non-transitory computer-readable medium of claim 15, wherein the one or more instructions, that cause the device to identify the plurality of locations, cause the device to:
determine whether a risk classification timer is satisfied; and
identify the plurality of locations further based on the risk classification timer being satisfied.

17. The non-transitory computer-readable medium of claim 15, wherein the one or more instructions, that cause the device to determine the plurality of risk levels corresponding to the plurality of locations, cause the device to:
determine risk levels associated with the data;
apply the weights to the risk levels to generate weighted risk levels; and
combine the weighted risk levels to determine the plurality of risk levels.

18. The non-transitory computer-readable medium of claim 15, wherein the one or more instructions, that cause the device to perform the one or more actions, cause the device to:
generate a risk report that identifies the plurality of locations and the plurality of risk levels;
generate a risk visualization map based on the risk report; and
provide the risk report and the risk visualization map for display.

19. The non-transitory computer-readable medium of claim 15, wherein the one or more instructions, that cause the device to perform the one or more actions, cause the device to one or more of:
provide, to the plurality of autonomous vehicles, instructions that cause the plurality of autonomous vehicles to travel the plurality of routes to the plurality of locations;
provide, to a non-autonomous vehicle, a notification identifying one of the plurality of routes to travel to one of the plurality of locations and one of the plurality of risk levels for the one of the plurality of locations;
cause at least one of the plurality of autonomous vehicles to travel to a standby area near one of the plurality of locations;
cause at least one of the plurality of the autonomous vehicles to perform an emergency function at one of the plurality of locations; or cause at least one of the plurality of autonomous vehicles to capture and provide video data of one of the plurality of locations.

20. The non-transitory computer-readable medium of claim 15, wherein the device is a first response system.

* * * * *